US012695316B2

(12) United States Patent
Kubo et al.

(10) Patent No.: US 12,695,316 B2
(45) Date of Patent: Jul. 28, 2026

(54) POWER STORAGE SYSTEM WITH CONTROL DEVICE

(71) Applicant: TOYOTA JIDOSHA KABUSHIKI KAISHA, Toyota (JP)

(72) Inventors: Kazuki Kubo, Toyota (JP); Ryotaro Uehata, Kariya-city (JP); Yuki Nagai, Kariya-city (JP); Junji Ohta, Takarazuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 747 days.

(21) Appl. No.: 18/124,238

(22) Filed: Mar. 21, 2023

(65) Prior Publication Data

US 2023/0387698 A1 Nov. 30, 2023

(30) Foreign Application Priority Data

May 31, 2022 (JP) ................................. 2022-088487

(51) Int. Cl.
H01M 10/46 (2006.01)
H02J 7/00 (2006.01)
H02J 7/52 (2026.01)

(52) U.S. Cl.
CPC ................ H02J 7/52 (2026.01); H02J 7/855 (2026.01)

(58) Field of Classification Search
CPC ........ H02J 7/40; H02J 7/90; H02J 7/84; H02J 7/82; H02J 7/52
USPC ........ 320/103, 107, 114, 116, 118, 119, 132, 320/149
See application file for complete search history.

(56) References Cited

U.S. PATENT DOCUMENTS

| | | | |
|---|---|---|---|
| 2014/0091762 A1* | 4/2014 | Kondo | B60L 53/14 320/109 |
| 2014/0104739 A1 | 4/2014 | Nakamoto et al. | |
| 2016/0211677 A1 | 7/2016 | Kobayashi et al. | |
| 2019/0148976 A1 | 5/2019 | Okada et al. | |
| 2021/0408805 A1* | 12/2021 | Wu | H02J 7/52 |
| 2023/0099799 A1* | 3/2023 | Chang | H01M 10/482 429/90 |
| 2024/0222971 A1* | 7/2024 | Wolfe | B60L 53/53 |

FOREIGN PATENT DOCUMENTS

| | | | |
|---|---|---|---|
| CN | 108011433 A | 5/2018 | |
| CN | 109891705 A | 6/2019 | |
| JP | 2001-237996 A | 8/2001 | |
| WO | 2015/029568 A1 | 3/2015 | |
| WO | WO-2018070037 A1 * | 4/2018 | H02M 7/48 |

* cited by examiner

*Primary Examiner* — Edward Tso
(74) *Attorney, Agent, or Firm* — Dinsmore & Shohl LLP

(57) ABSTRACT

A power storage system includes: a stationary power storage device configured to supply electric power to an electrical load; a control device configured to receive supply of electric power from each of the power storage device and another power source; a relay located between the power storage device and the control device and between the power storage device and the electrical load, but not between the control device and the power source; and an input device configured to accept input from a user. When a connection request is input to the input device while the relay is in a disconnected state, the control device brings the relay into a connected state.

3 Claims, 4 Drawing Sheets

POWER STORAGE SYSTEM WITH CONTROL DEVICE

CROSS-REFERENCE TO RELATED APPLICATION

This application claims priority to Japanese Patent Application No. 2022-088487 filed on May 31, 2022 incorporated herein by reference in its entirety.

BACKGROUND

1. Technical Field

The present disclosure relates to a power storage system

2. Description of Related Art

WO 2015/029568 discloses a technique for equalizing cell voltages in an assembled battery.

SUMMARY

The stationary power storage device is expected to be used continuously. The stationary power storage device is therefore basically in a closed circuit state. However, when maintenance of the power storage device is performed, the power storage device is opened. That is, maintenance is performed in a state in which the power storage device is open (open circuit state). For example, by bringing a relay disposed between the power storage device and a control device (a control unit of a power storage system) into a disconnected state, the power storage device is brought into a non-energized state, allowing processes related to maintenance of the power storage device to be performed. Examples of processes related to maintenance include above-described equalization of cell voltages in the assembled battery, correction of various sensors for acquiring information on the power storage device, and the like.

However, when the relay disposed between the power storage device and the control device is brought into the disconnected state, the control device cannot receive power supply from the power storage device. This can cause the control device to lose the power source and stop, rendering it inoperable.

The present disclosure provides a power storage system that can suppress a control unit (control device) of a power storage system from becoming inoperable when a power storage device is opened.

An aspect of the present disclosure is a power storage system. The power storage system includes a power storage device, a control device, a relay, and an input device. The power storage device is configured to supply electric power to an electrical load and is stationary. The control device is configured to receive supply of electric power from each of the power storage device and another power source. The relay is located between the power storage device and the control device and between the power storage device and the electrical load, but not between the control device and the power source. The input device is configured to accept input from a user. When a connection request is input to the input device while the relay is in a disconnected state, the control device is configured to bring the relay into a connected state.

According to the above configuration, the control device can receive supply of electric power from each of the power storage device and another power source. The power source other than the power storage device may include, for example, at least one of a power grid and a power generation device. Since the relay is located between the power storage device and the electrical load, the control device can electrically disconnect the power storage device from the circuit of the electrical load by bringing the relay into the disconnected state. Therefore, the power storage device is brought into an open circuit state, allowing maintenance of the power storage device to be performed. Since the relay is located between the power storage device and the control device, electric power is not supplied from the power storage device to the control device when the relay is brought into the disconnected state. However, since the relay is not located between the control device and the power source other than the power storage device, when the relay is brought into the disconnected state, the control device can control the relay while receiving power supply from the power source other than the power storage device.

However, power supply from the power source is not always available to the control device. It is also conceivable that an abnormality occurs in the power source and the power supply from the power source to the control device stops (power outage). Moreover, in the form in which the power source includes the power generation device, the power generation device may not be able to generate sufficient electric power. Therefore, in the above configuration, when the user inputs a connection request to the input device, the control device brings the relay into the connected state. The user can confirm the status of the power source and bring the relay into the connected state as necessary. This makes it possible to suppress the control device from losing the power source and being unable to operate.

In the power storage system, the power storage device may include an assembled battery including a plurality of cells electrically connected to each other. The control device may be configured to execute equalization of cell voltages in the assembled battery when the relay is in the disconnected state. The control device may be configured to stop the equalization of the cell voltages and then bring the relay into the connected state when the connection request is input to the input device while executing the equalization of the cell voltages.

According to the above configuration, the control device can automatically execute the equalization of the cell voltages in the assembled battery. This makes it possible to suppress the variation in the cell voltages in the assembled battery from becoming excessively large.

In the power storage system, the input device may be configured to accept input of the connection request when a predetermined condition is satisfied, and may be configured not to accept the input of the connection request when the predetermined condition is not satisfied. The predetermined condition may be satisfied when a prediction is made that predetermined electric power is not to be supplied from the power source to the control device.

According to the above configuration, when it is predicted that the predetermined electric power (for example, electric power for maintaining the control device in an operating state) will not be supplied to the control device from the power source other than the power storage device, the input device accepts the input of the connection request. This makes it easier for the user to appropriately determine whether it is necessary to bring the relay into the connected state.

In the power storage system, the input device may be mounted on a mobile terminal that is able to be carried by the user. The mobile terminal may be configured to display a button for accepting the input of the connection request when the predetermined condition is satisfied.

According to the above configuration, a button for accepting the input of the connection request is displayed on the mobile terminal when the predetermined condition is satisfied. This allows the user to easily and quickly bring the relay to the connected state.

According to the present disclosure, it is possible to suppress a control unit (control device) of a power storage system from becoming inoperable when a power storage device is opened.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
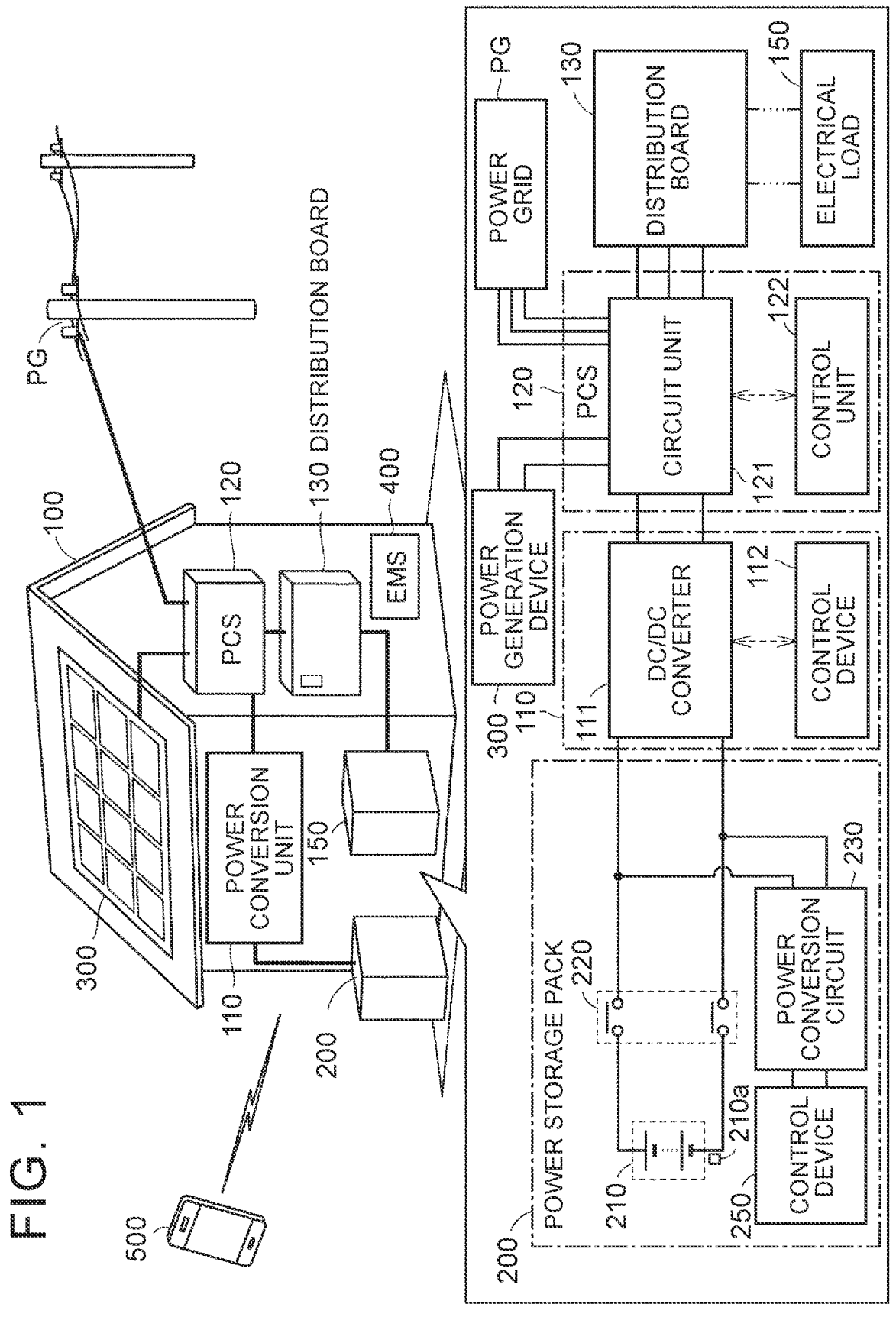
FIG. 1 is a diagram illustrating an overview of a power storage system according to an embodiment of the present disclosure.

An embodiment of the present disclosure will be described in detail with reference to the drawings. The same or corresponding parts in the drawings are designated by the same reference signs and repetitive description will be omitted.

FIG. 1 is a diagram illustrating an overview of a power storage system according to the embodiment of the present disclosure. Referring to FIG. 1, the power storage system according to the present embodiment is applied to a building 100. In the present embodiment, the building 100 is a residence (e.g., the user's home). However, the building 100 is not limited to this, and may be other buildings (factories, commercial facilities, etc.).

The power storage system of the building 100 includes a control device 112, a control unit 122, a control device 250, and various sensors. Each of the control device 112, the control unit 122, and the control device 250 corresponds to a control unit of the power storage system and receives detection results from various sensors to control power source facilities of the building 100. Also, the control unit of the power storage system wirelessly communicates with a mobile terminal 500.

As each of the control device 112, the control unit 122, and the control device 250, a computer having a processor, a random access memory (RAM), a storage device, a timer, and a communication interface (I/F) can be employed. The mobile terminal 500 is also equipped with a computer having a similar configuration. For example, a central processing unit (CPU) can be used as the processor. The storage device is configured to be able to save the stored information. The storage device may include a rewritable non-volatile memory. In each computer, a processor executes a program stored in the storage device to execute various processes (e.g., see FIGS. 2 to 4). However, these various processes are not limited to being executed by software, and can be executed by dedicated hardware (electronic circuits).

The mobile terminal 500 is carried by a user. In the present embodiment, a smart phone equipped with a touch panel display is adopted as the mobile terminal 500. The touch panel display functions as an input device that accepts input from the user. The touch panel display also functions as a display device that displays information to the user. Application software for using the power storage system is installed in the mobile terminal 500. However, the mobile terminal 500 is not limited to this, and any mobile terminal 500 can be adopted as the mobile terminal 500. A laptop, a tablet terminal, a wearable device (e.g., a smart watch, smart glasses), or an electronic key can also be adopted.

The control device 112, the control unit 122, and the control device 250 are connected via a bus (not shown), for example, and communicate with each other by wire. In the present embodiment, the mobile terminal 500 and the control unit 122 communicate directly, but the mobile terminal 500 and the control device 250 do not communicate directly. Information is exchanged between the mobile terminal 500 and the control device 250 via the control unit 122. This improves the confidentiality of the information security of the control device 250. However, the present disclosure is not limited to this, and the mobile terminal 500 may be configured to be able to directly communicate with each of the control device 112, the control unit 122, and the control device 250.

In the present embodiment, the control device 112, the control unit 122, and the control device 250 are respectively accommodated in a power conversion unit 110, a power conditioning system (PCS) 120, and a power storage pack 200, which will be described below.

The power storage system of the building 100 includes the power conversion unit 110, the PCS 120, and a distribution board 130. The building 100 is provided with the stationary power storage pack 200 and a power generation device 300. The power storage pack 200 is electrically connected to the power conversion unit 110. The power generation device 300 is electrically connected to the PCS 120.

The power conversion unit 110 includes a direct-current to direct-current (DC/DC) converter 111 and the control device 112 that controls the DC/DC converter 111. The DC/DC converter 111 is a bidirectional DC/DC converter that bidirectionally converts electric power (for example, transforms voltages) between the PCS 120 and the power storage pack 200. The DC/DC converter 111 may be a step-up/step-down chopper bidirectional DC/DC converter.

In some embodiments, the power conversion unit 110 may be omitted. For example, the function of the DC/DC converter 111 may be provided in a circuit unit 121 of the PCS 120.

The PCS 120 is electrically connected to a power grid PG. The power grid PG includes a power network, power generation equipment, and substation equipment. The power network is constructed by power transmission and distribution equipment. The power grid PG supplies electric power to a predetermined area. The building 100 is located within the predetermined area. The power grid PG supplies alternating current (AC) power (e.g., single-phase or three-phase AC power) to the PCS 120.

The PCS 120 includes the circuit unit 121 and the control unit 122 that controls the circuit unit 121. The circuit unit 121 includes various circuits for processes related to power conditioning (for example, power conversion and input/ output adjustment). In the present embodiment, the circuit unit 121 includes a DC/DC converter and an AC/DC conversion circuit (inverter). However, the circuit configuration of the circuit unit 121 can be changed as appropriate. Electric power is input to the circuit unit 121 from each of the power grid PG, the power generation device 300, and the DC/DC converter 111 (of the power storage pack 200). The circuit unit 121 outputs electric power to each of the DC/DC converter 111 and the distribution board 130. The circuit unit 121 converts AC power received from the power grid PG into DC power, and outputs the DC power to the DC/DC converter 111 (of the power storage pack 200).

The power generation device 300 generates electric power using natural energy or fuel, and outputs the generated electric power to the circuit unit 121 of the PCS 120. The power generation device 300 according to the present embodiment includes a solar panel installed on the roof of the building 100. The solar panel generates electric power using sunlight. The solar panel is a naturally fluctuating power source of which power generation output fluctuates depending on weather conditions. However, the power generation device 300 is not limited to a solar panel, and may include other power generation devices (for example, wind power generation devices or hydroelectric power generation devices).

The distribution board 130 receives supply of electric power (for example, single-phase or three-phase AC power) from the circuit unit 121 of the PCS 120. The circuit unit 121 converts electric power received from each of the power grid PG, the power generation device 300, and the DC/DC converter 111 into electric power suitable for the distribution board 130, and outputs the converted electric power to the distribution board 130. The distribution board 130 is electrically connected to an electrical load 150. The electrical load 150 receives power supply from the distribution board 130. The electrical load 150 may be directly connected to the distribution board 130. Alternatively, the electrical load 150 may be electrically connected to the distribution board 130 via an outlet (not shown) provided in the building 100. The electrical load 150 may include a lighting device. The electrical load 150 may include electrical loads used indoors in the building 100 (air conditioners, information equipment, refrigerators, etc.). The electrical load 150 may include vehicle power supply equipment installed outside the building 100.

The power storage pack 200 includes a power storage device 210, a battery management system (BMS) 210*a*, a system main relay (SMR) 220, a power conversion circuit 230, and the control device 250. The power storage device 210 is a stationary power storage device that supplies electric power to the electrical load 150. In the present embodiment, an assembled battery including a plurality of cells (secondary batteries) electrically connected to each other is employed as the power storage device 210. However, the power storage device 210 is not limited to this, and any power storage device can be employed as the power storage device 210.

The power storage device 210 is provided with the BMS 210*a* that monitors the state of the power storage device 210. The BMS 210*a* includes various sensors that detect the state of the power storage device 210 (for example, voltage, current, and temperature), and a monitoring integrated circuit (IC) to which detection signals from the various sensors are input. In the present embodiment, one voltage sensor is provided for each cell constituting the power storage device 210 (assembled battery).

The monitoring IC uses the detection signals from the various sensors to generate a signal indicating the state of the power storage device 210 (hereinafter also referred to as "BMS signal"), and outputs the generated BMS signal to the control device 250. The control device 250 can acquire the state of the power storage device 210 (for example, temperature, current, voltage, state of charge (SOC), and state of health (SOH)) based on the BMS signal. In the present embodiment, the monitoring IC further has a function of equalizing cell voltages. Specifically, a switch (not shown) is provided between adjacent cells in the power storage device 210 to switch connection/disconnection of an electrical path connecting the cells. These switches are controlled by the monitoring IC. The monitoring IC executes equalization of cell voltages by switching the closed/open state of each switch.

The SMR 220 switches connection/disconnection of an electrical path connecting the power storage device 210 and the DC/DC converter 111. The SMR 220 includes, for example, a pair of relays (e.g., electromagnetic mechanical relays). These relays are located between the power storage device 210 and the control device 250 and between the power storage device 210 and the distribution board 130 (the electrical load 150), and are not located between the control device 250 and the PCS 120 (the power grid PG, the power generation device 300). The SMR 220 is controlled by the control device 250. The SMR 220 is basically maintained in a closed state (connected state), but is disconnected when a predetermined condition is satisfied (see FIG. 2 described later). Note that the number of relays included in the SMR 220 can be changed as appropriate.

In the present embodiment, the control unit 122 of the PCS 120 switches between interconnected operation and self-sustained operation. While electric power is being supplied from the power grid PG to the PCS 120, the control unit 122 brings the building 100 into a state of interconnected operation. During the interconnected operation, the power grid PG and the distribution board 130 are electrically connected. On the other hand, when some trouble occurs in the power grid PG and the power supply from the power grid PG to the distribution board 130 stops (power outage), the control unit 122 brings the building 100 into a state of self-sustained operation. During the self-sustained operation, the control unit 122 controls the circuit unit 121 so that the power grid PG and the distribution board 130 are electrically disconnected. In the self-sustained operation, a power source (the power storage device 210, the power generation device 300) other than the power grid PG supplies electric power to the distribution board 130.

The power conversion circuit 230 is connected to an electrical path branched from a position between the SMR 220 and the DC/DC converter 111. The power conversion circuit 230 includes a DC/DC converter. The power conversion circuit 230, for example, steps down input DC power and outputs the stepped-down DC power to the control device 250. During the interconnected operation, electric power is supplied from the power grid PG to the power conversion circuit 230 via the PCS 120 and the DC/DC converter 111. During the self-sustained operation, electric power is supplied from the power storage device 210 or the power generation device 300 to the power conversion circuit 230. The power conversion circuit 230 converts the supplied electric power into electric power suitable for operating the control device 250 (for example, DC power of approximately 12 V), and outputs the converted electric power to the control device 250.

The building 100 includes an energy management system (EMS) 400. In the present embodiment, the EMS 400 is configured to be able to communicate with the control unit 122 of the PCS 120. The EMS 400 acquires the generated power and the demanded power of the building 100 from a watt-hour meter (not shown) provided in the building 100 and records them over time. The EMS 400 also acquires grid information indicating the status of the power grid PG (supply-demand balance, frequency, etc.) from a transmission system operator (TSO) of the power grid PG, and predicts whether the power supply from the power grid PG to the PCS 120 (and thus to the control device 250) will stop (power outage) based on the grid information. The grid information may include disaster prediction information (for example, earthquake early warning or approaching typhoon information) for predicting the occurrence of a disaster that may affect the operation of the power grid PG. The EMS 400 notifies the control unit 122 of the time zone in which the power grid PG is predicted to be out of power.

The EMS 400 also predicts electric power to be generated by the power generation device 300 (solar panel) based on weather forecast information (prediction information such as weather, temperature, solar radiation intensity, and wind power). When electric power generated by the power generation device 300 exceeds the demanded power and surplus power is generated, the EMS 400 transmits to the control unit 122 a signal requesting storage of the surplus power in the power storage device 210. In addition, the EMS 400 predicts whether electric power equal to or greater than a predetermined reference power will be supplied from the power generation device 300 to the PCS 120 (and thus to the control device 250) for each pre-delimited time zone. The EMS 400 notifies the control unit 122 of the time zone in which the electric power to be supplied from the power generation device 300 to the PCS 120 is predicted to fall below the reference power. The EMS 400 may acquire the weather forecast information using a known weather service (for example, a service provided by the Japan Meteorological Agency). The EMS 400 manages the weather forecast information separately for each area and time.

As described above, in the present embodiment, the EMS 400 transmits to the control unit 122 the future time zone in which it is predicted that the predetermined electric power will not be supplied from the power sources other than the power storage device 210 (the power grid PG, the power generation device 300) to the control device 250. However, the present disclosure is not limited to this, and the control unit (the control device 112, the control unit 122, the control device 250) of the power storage system may perform the above prediction instead of the EMS 400.

Figure 2:
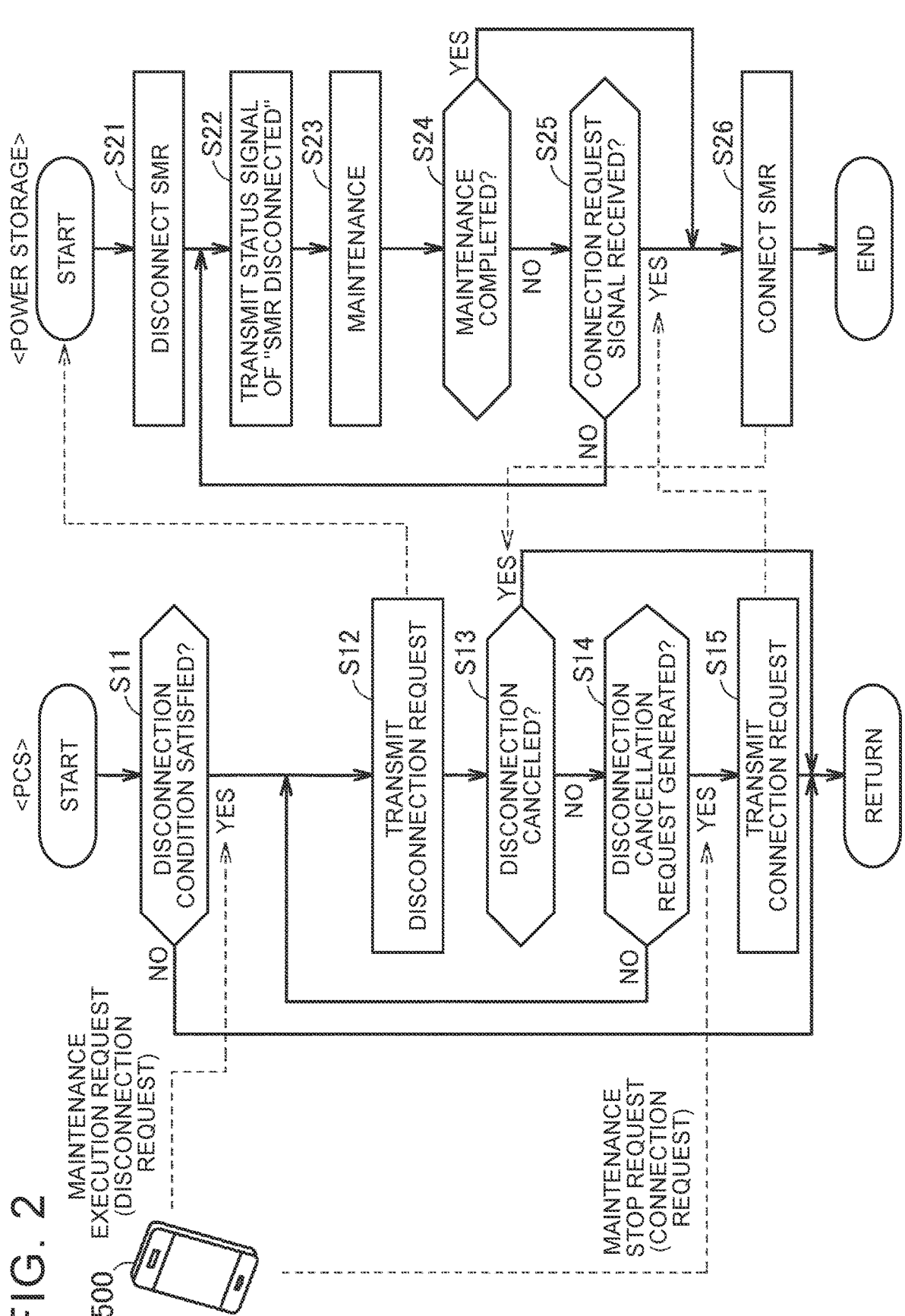
FIG. 2 is a flowchart showing an example of a method for switching between open/closed states (open circuit state/closed circuit state) of a power storage device according to the embodiment of the present disclosure.

FIG. 2 is a flowchart showing an example of a method for switching between open/closed states (open circuit state/closed circuit state) of the power storage device 210. "S" in the flowchart means step. A series of processes from S11 to S15 is executed by the control unit 122 (the PCS 120), and a series of processes from S21 to S26 is executed by the control device 250 (the power storage pack 200). The control unit 122 monitors whether a disconnection condition is satisfied by repeating the series of processes of S11 to S15.

Referring to FIG. 2 together with FIG. 1, in S11, the control unit 122 determines whether a predetermined disconnection condition is satisfied. In the present embodiment, the disconnection condition is satisfied when the control unit of the power storage system has received a disconnection request from the user, and the disconnection condition is not satisfied when the control unit of the power storage system has not received the disconnection request from the user. In the present embodiment, the fact that the control unit 122 has received a maintenance execution request signal from the mobile terminal 500 means that the control unit of the power storage system has received the disconnection request from the user. The maintenance execution request signal will be described later (see FIG. 3).

While the disconnection condition is not satisfied (NO in S11), the determination of S11 is repeated. On the other hand, when the disconnection condition is satisfied (YES in S11), the control unit 122 transmits a disconnection request signal requesting the disconnection of the SMR 220 to the control device 250 in S12, and determines whether the SMR disconnection has been canceled in subsequent S13. The control unit 122 determines NO in S13 while the control unit 122 is receiving a status signal indicating "SMR disconnected" (S22) described later from the control device 250, and determines YES in S13 when the status signal is no longer received.

When the SMR disconnection has not been canceled (NO in S13), the control unit 122 determines in S14 whether a disconnection cancellation request has been generated. In the present embodiment, when the control unit of the power storage system receives a connection request from the user, it is determined that the disconnection cancellation request is generated. When the control unit of the power storage system has not received a connection request from the user, it is determined as NO in S14. While it is determined as NO in S13 and NO in S14, S12 to S14 are repeated. In the present embodiment, the fact that the control unit 122 has received a maintenance stop request signal from the mobile terminal 500 means that the control unit of the power storage system has received a connection request from the user. The maintenance stop request signal will be described later (see FIG. 4).

When the disconnection cancellation request is generated (YES in S14), the control unit 122 transmits to the control device 250 a connection request signal requesting connection of the SMR 220 in S15. When it is determined as YES in S13 or when the process of S15 is executed, the series of processes of S11 to S15 is completed, and the process returns to the first step (S11).

When the control device 250 receives the above-described disconnection request signal (S12) from the control unit 122, the series of processes of S21 to S26 is started. After bringing the SMR 220 (the pair of relays) into the open state (disconnected state) in S21, the control device 250 transmits to the control unit 122 a status signal of "SMR disconnected" indicating that the SMR 220 is in the disconnected state in S22. The control unit 122 may transmit the received status signal of "SMR disconnected" to the mobile terminal 500. With the process of S21, the electrical path connecting the power storage device 210 and the DC/DC converter 111 is disconnected, and the power storage device 210 is brought to an open circuit state (open state).

Subsequently, in S23, the control device 250 executes processes related to maintenance of the power storage device 210 that has been opened. Specifically, the control device 250 causes the monitoring IC (the BMS 210*a*) to execute first and second items described below as the processes related to maintenance.

The first item is self-diagnosis of the monitoring IC included in the BMS 210*a*. Specifically, when the power storage device 210 is in a non-energized state (current of A), the monitoring IC acquires the open circuit voltage (OCV) of the power storage device 210 from the voltage sensor included in the BMS 210*a*, and outputs the acquired OCV to the control device 250. The monitoring IC self-diagnoses whether the monitoring IC can operate normally based on whether the acquisition of the OCV was performed normally. The control device 250 associates the OCV received from the monitoring IC with the acquisition time and saves the OCV in the storage device.

The second item is the equalization of cell voltages in the power storage device 210. Specifically, the monitoring IC executes opening/closing control of switches provided between adjacent cells of the power storage device 210 so that the cell voltages in the power storage device 210 are equalized.

In subsequent S24, the control device 250 determines whether the maintenance of the power storage device 210 has been completed. The control device 250 determines whether each item has been completed. When any item is completed, the control device 250 saves in the storage device or transmits to the mobile terminal 500 the time when the item was completed and the information obtained during the maintenance (for example, information regarding abnormality). When all the items are completed, it is determined as YES in S24, and the process proceeds to S26. When any of the items is not completed, it is determined as NO in S24, and the process proceeds to S25.

In S25, the control device 250 determines whether the above-described connection request signal (S15) has been received from the control unit 122. While the maintenance of the power storage device 210 has not been completed and the control device 250 has not received the connection request signal (NO in both S24 and S25), S22 to S25 are repeated. Thereby, the maintenance (S23) of the power storage device 210 is continued. On the other hand, when the maintenance is completed (YES in S24) or when the control device 250 receives the connection request signal (YES in S25), the process proceeds to S26.

In S26, the control device 250 returns the SMR 220 (the pair of relays) to the closed state (connected state). For example, when the control device 250 receives the connection request signal during the maintenance of the power storage device 210, the control device 250 stops the maintenance and then brings the SMR 220 into the connected state. Thereby, the power storage device 210 is brought into the closed circuit state, and the status signal indicating "SMR disconnected" (S22) is no longer transmitted from the control device 250 to the control unit 122. Then, the series of processes from S21 to S26 ends.

Note that the maintenance items are not limited to the first and second items described above. For example, the maintenance item may be only the second item. Further, the maintenance items may include at least one of correction of various sensors for acquiring information of the power storage device 210, SOC learning through acquisition of the OCV of the power storage device 210, and estimation of full charge capacity of the power storage device 210.

Display control executed by the mobile terminal 500 will be described below with reference to FIGS. 3 and 4. The mobile terminal 500 repeatedly executes the series of processes shown in FIG. 3 while the mobile terminal 500 has not received the above-described status signal of "SMR disconnected" (when the maintenance is not executed), and repeatedly executes the series of processes shown in FIG. 4 while the mobile terminal 500 is receiving the above-described status signal of "SMR disconnected" (when the maintenance is executed).

Figure 3:
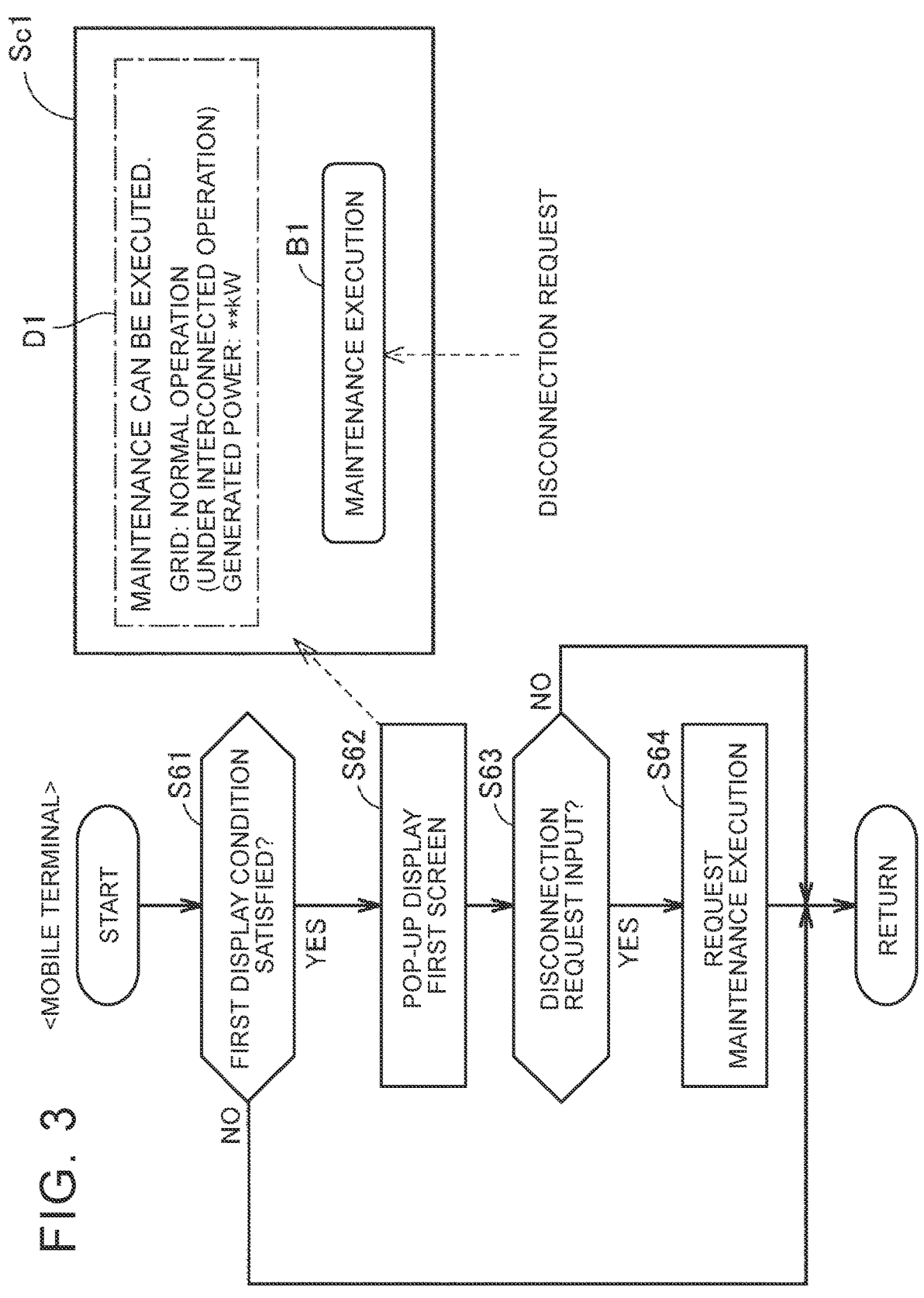
FIG. 3 is a flowchart showing first display control executed by an input device (mobile terminal) included in the power storage system shown in FIG. 1.

FIG. 3 is a flowchart showing first display control executed by the mobile terminal 500. Referring to FIG. 3 together with FIG. 1, in S61, the mobile terminal 500 determines whether a predetermined first display condition is satisfied. The first display condition according to the present embodiment is satisfied when one of a condition that the building 100 is under the interconnected operation (first interconnection condition) and a condition that the electric power generated by the power generation device 300 is equal to or greater than a predetermined reference power (first power generation condition) is satisfied, and the first display condition is not satisfied when neither is satisfied. The mobile terminal 500 may determine whether the first display condition is satisfied based on the information from the EMS 400 (for example, the grid information and the weather information).

When the first display condition is satisfied (YES in S61), the mobile terminal 500 pop-up displays a first screen Sc1 in S62. The first screen Sc1 includes information D1 including a message prompting maintenance execution, and a maintenance execution button B1. The information D1 further includes the status of the power grid PG (operating status, etc.) and the status of the power generation device 300 (generated power, etc.). The first screen Sc1 accepts input of a disconnection request. The user can input the disconnection request to the mobile terminal 500 by operating (for example, pressing) the maintenance execution button B1.

In subsequent S63, the mobile terminal 500 determines whether the disconnection request has been input from the user. In the present embodiment, when the maintenance execution button B1 has been operated by the user, it is determined as YES in S63, and the process proceeds to S64. In S64, the mobile terminal 500 transmits the above-described maintenance execution request signal (see S11 in FIG. 2) to the control unit 122. After that, the process returns to the first step (S61). On the other hand, when the maintenance execution button B1 is not operated by the user, it is determined as NO in S63, and the process returns to the first step (S61) without transmission of the maintenance execution request signal.

Figure 4:
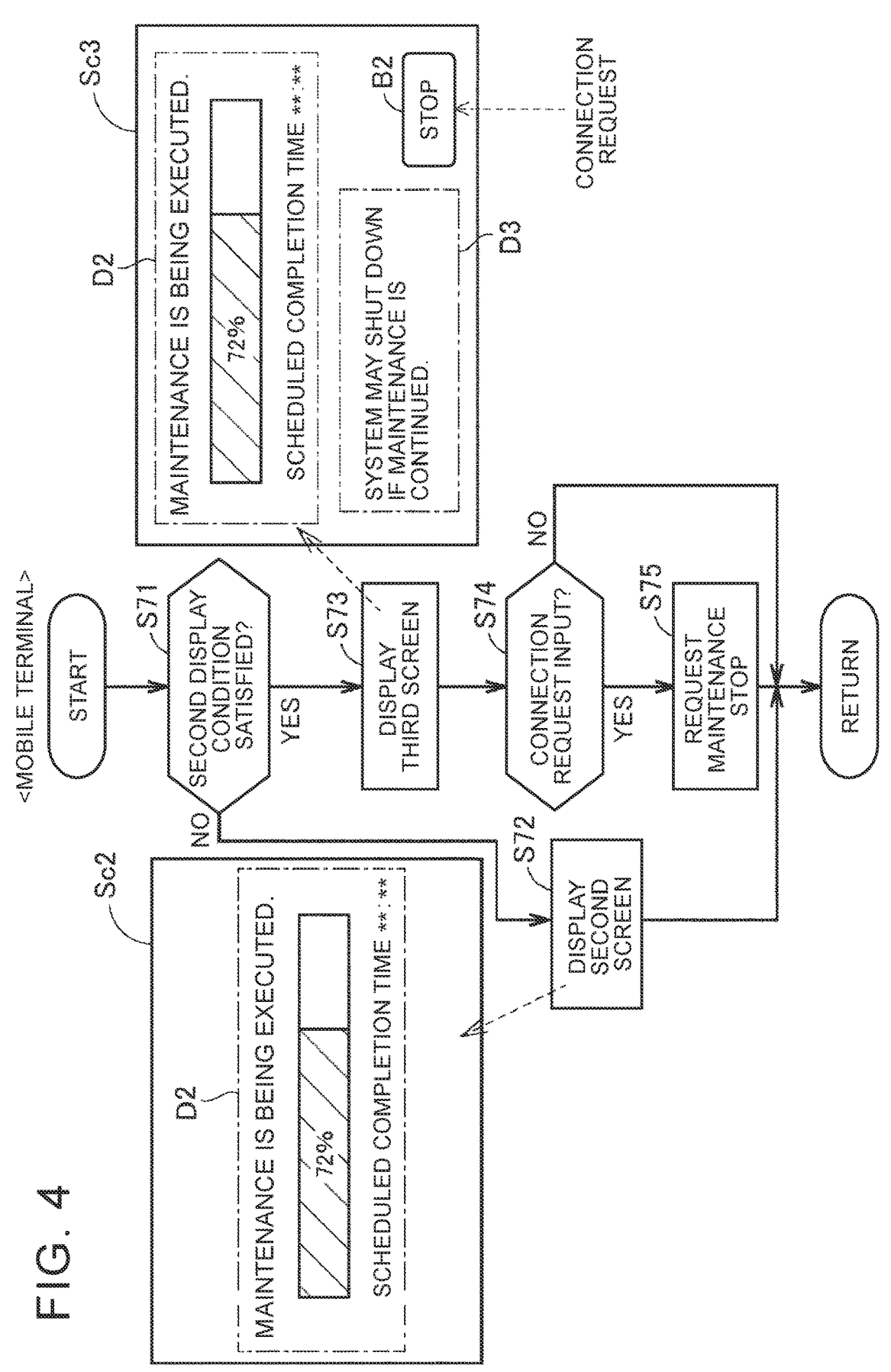
FIG. 4 is a flowchart showing second display control executed by the input device (mobile terminal) included in the power storage system shown in FIG. 1.

FIG. 4 is a flowchart showing second display control executed by the mobile terminal 500. Referring to FIG. 4 together with FIG. 1, in S71, the mobile terminal 500 determines whether a predetermined second display condition is satisfied. The second display condition according to the present embodiment is satisfied when both a condition that the time zone in which the power grid PG is predicted to be out of power will arrive within a predetermined time from the current time (second interconnection condition) and a condition that the time zone in which electric power supplied from the power generation device 300 to the PCS 120 is predicted to fall below the predetermined reference power arrives within the above-mentioned predetermined time from the current time (second power generation condition) are satisfied, and the second display condition is not satisfied when either one is not satisfied. The predetermined reference power may be electric power that can maintain the control device 250 in an operating state. The mobile terminal 500 may determine whether each of the second interconnection condition and the second power generation condition is satisfied based on the information from the EMS 400 (for example, the grid information and the weather forecast information). Satisfaction of the second display condition means that it is predicted that predetermined electric power will not be supplied from a power source other than the power storage device 210 (the power grid PG, the power generation device 300) to the control device 250.

When the second display condition is not satisfied (NO in S71), the mobile terminal 500 displays a second screen Sc2 in S72. The second screen Sc2 includes information D2 indicating that maintenance is being executed. The information D2 further includes the degree of maintenance progress and the scheduled maintenance completion time. The second screen Sc2 does not accept input of a connection request. While the second display condition is not satisfied (NO in S71), the processes of S71 and S72 are repeated.

When the second display condition is satisfied (YES in S71), the mobile terminal 500 displays a third screen Sc3 in S73. In addition to the information D2, the third screen Sc3 further includes information D3 prompting maintenance to be stopped, and a maintenance stop button B2. The third screen Sc3 accepts input of a connection request. The user can input a connection request to the mobile terminal 500 by operating (for example, pressing) the maintenance stop button B2.

After the process of S73, the mobile terminal 500 determines whether the user has input a connection request in S74. In the present embodiment, when the maintenance stop button B2 has been operated by the user, it is determined as YES in S74, and the process proceeds to S75. In S75, the mobile terminal 500 transmits the above-described maintenance stop request signal (see S14 in FIG. 2) to the control unit 122. After that, the process returns to the first step (S71). On the other hand, when the maintenance stop button B2 is not operated by the user, it is determined as NO in S74, and the process returns to the first step (S71) without transmission of the maintenance stop request signal.

As described above, in the power storage system according to the present embodiment, even when the SMR 220 is brought to the disconnected state, the control device 250 can receive power supply from at least one of the power grid PG and the power generation device 300. However, power supply from these power sources is not always available to the control device 250. Therefore, in the above power storage system, when a connection request is input to the mobile terminal 500 (input device) while the SMR 220 is in the disconnected state (YES in S74 of FIG. 4), the control device 250 brings the SMR 220 into the connected state (S26 in FIG. 2). When a connection request is input to the mobile terminal 500 during execution of equalization of cell voltages (second item), the control device 250 stops the equalization of cell voltages and then brings the SMR 220 into the connected state. The user can confirm the status of each of the power grid PG and the power generation device 300 to bring the SMR 220 into the connected state as necessary. This makes it possible to suppress the control device 250 from losing the power source and being unable to operate. A human machine interface (HMI) is not limited to the mobile terminal 500, and a terminal other than the mobile terminal may be used as the HMI (input device, etc.). The HMI may accept voice input from the user.

Each of the disconnection condition (S11) and the generation condition of the disconnection cancellation request (S14) in the processes shown in FIG. 2 can be changed as appropriate. For example, the control unit 122 may learn how the user uses the electrical load 150 based on the weather information and the demanded power, and establish the disconnection condition (S11) during the time zone when the electrical load 150 is not used. The EMS 400 may determine whether maintenance can be executed based on the grid information and the weather information, and transmit a predetermined first signal from the EMS 400 to the control unit 122 at the timing at which maintenance can be executed. When the control unit 122 receives the first signal, the disconnection condition (S11) may be satisfied. Also, the EMS 400 may predict whether power supply to the circuit unit 121 (PCS 120) will run short based on the disaster prediction information and the weather forecast information.

When it is predicted that the power supply to the circuit unit 121 will run short, a predetermined second signal may be transmitted from the EMS 400 to the control unit 122. When the control unit 122 receives the second signal, the disconnection cancellation request (S14) may be generated. The disconnection cancellation request (S14) may be generated also when electric power generated by the power generation device 300 (photovoltaic power) is equal to or less than a predetermined value.

Each of the first and second display conditions (FIGS. 3 and 4) can also be changed as appropriate. For example, the first display condition (S61 in FIG. 3) may be satisfied only when electric power generated by the power generation device 300 (photovoltaic power) is equal to or greater than a predetermined value.

The display content of each of the first screen Sc1 to the third screen Sc3 (FIGS. 3 and 4) can also be changed as appropriate. The EMS 400 may obtain a recommended maintenance timing and transmit the recommended maintenance timing to the mobile terminal 500. The mobile terminal 500 may then display the recommended maintenance timing (advice to the user) on the first screen Sc1 (FIG. 3).

The embodiment disclosed herein should be considered as illustrative and not restrictive in all respects. The scope of the present disclosure is shown by the claims rather than the above embodiment, and is intended to include all modifications within the meaning and the scope equivalent to those of the claims.

What is claimed is:

1. A power storage system comprising:
   a stationary power storage device configured to supply electric power to an electrical load;
   a control device configured to receive supply of electric power from each of the stationary power storage device and another power source;
   a relay located between the stationary power storage device and the control device and between the stationary power storage device and the electrical load, but not between the control device and the another power source; and
   an input device configured to accept input from a user, wherein when a connection request is input to the input device while the relay is in a disconnected state, the control device is configured to bring the relay into a connected state;
   wherein:
   the stationary power storage device includes an assembled battery including a plurality of cells electrically connected to each other;
   the control device is configured to execute equalization of cell voltages in the assembled battery when the relay is in the disconnected state; and
   the control device is configured to stop the equalization of the cell voltages and then bring the relay into the connected state when the connection request is input to the input device while executing the equalization of the cell voltages.

2. The power storage system according to claim 1, wherein:
   the input device is configured to accept input of the connection request when a predetermined condition is satisfied, and is configured not to accept the input of the connection request when the predetermined condition is not satisfied; and the predetermined condition is satisfied when a prediction is made that predetermined electric power is not to be supplied from the another power source to the control device.

3. The power storage system according to claim 2, wherein:

the input device is mounted on a mobile terminal that is able to be carried by the user; and the mobile terminal is configured to display a button for accepting the input of the connection request when the predetermined condition is satisfied.

* * * * *